W. C. CHAMPION.
Seed-Planter.

No. 168,718.

Patented Oct. 11, 1875.

WITNESSES
Franck L. Ourand
C. L. Evert.

INVENTOR
Will C. Champion,
By Alexander Mason
Attorney

UNITED STATES PATENT OFFICE

WILL C. CHAMPION, OF STANTON, TENNESSEE.

IMPROVEMENT IN SEED-PLANTERS.

Specification forming part of Letters Patent No. 168,718, dated October 11, 1875; application filed September 11, 1875.

*To all whom it may concern:*

Be it known that I, WILL C. CHAMPION, of Stanton, in the county of Haywood and in the State of Tennessee, have invented certain new and useful Improvements in Seed-Planters; and do hereby declare that the following is a full, clear, and exact description thereof, reference being had to the accompanying drawings and to the letters of reference marked thereon, making a part of this specification.

The nature of my invention consists in the construction and arrangement of a seeding apparatus, and drag for covering the seed with an ordinary shovel-plow, the peculiarities of which will be hereinafter more fully set forth.

Figure 1:
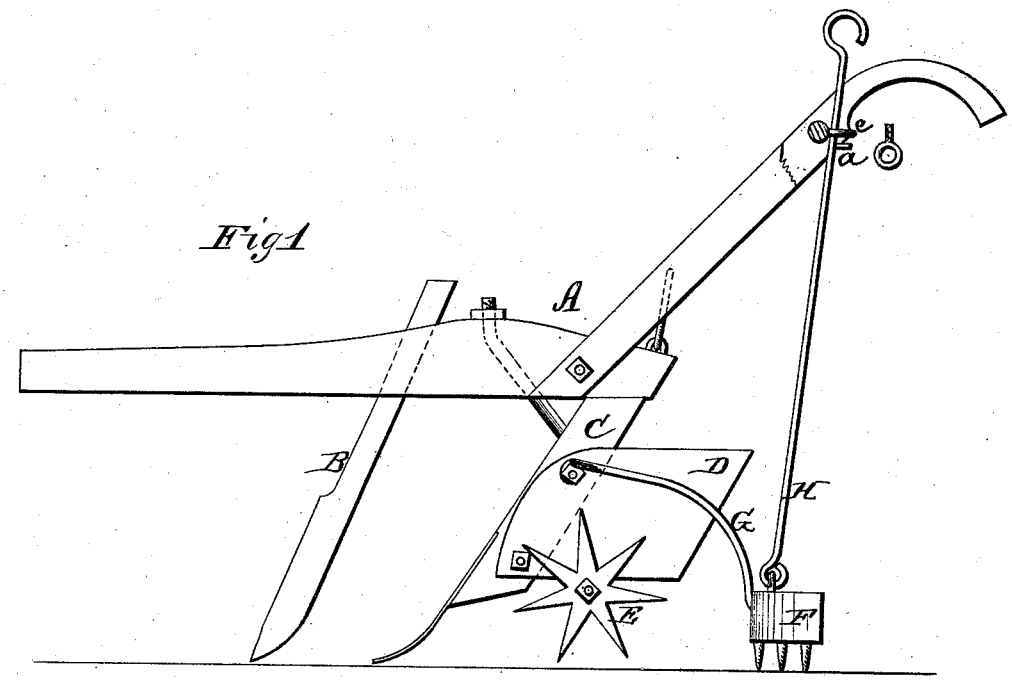
Figure 2:
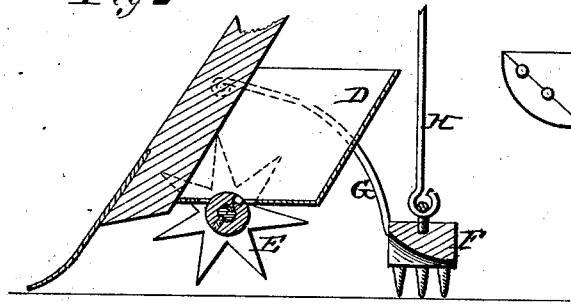
Figure 3:

In the annexed drawings, making part of this specification, Figure 1 represents a side view of the invention; Fig. 2, a section of seed-box and drag; and Fig. 3 an inverted plan view of the drag.

In the figures, A represents a shovel-plow, constructed in any of the known and usual ways, secured to the foot C, and immediately behind it is a seed-box, constructed of metal, to hold about two gallons of corn. Beneath this seed-box and secured in proper bearings is a shaft, on each end of which is a wheel constructed with pointed spokes, but no rim or tire. Upon the center of the shaft is a seed-wheel, said wheel cutting into an opening in the seed-box made to receive it, and being provided in its periphery with a seed-opening or seed-openings—two or more, if desirable. The revolution of the wheel carries the seed from the box in the ordinary manner.

Behind the plow and seed-box is a drag, F, which consists of a block of wood hollowed out about its front and center and provided with harrow-teeth. The teeth near the center are arranged so that they draw the earth over the corn and cover it well. The drag is hinged to the foot C by means of the rods G G, and is raised or lowered by means of a rod, H. The rod H passes up from the drag through an eye on the handle of the plow, and has upon it a stop, $a$, by means of which the drag can be lifted and held while the plow is being moved from place to place. The stop $a$ catches upon the eye $e$ to hold the drag up.

Having thus fully described my invention, what I claim as new, and desire to secure by Letters Patent, is—

The combination, with the plow A, of the seed-box, the seeding-wheel, and the spoke-wheels E, the drag F, as constructed, and the rods G and H, all as and for the purpose set forth.

In testimony that I claim the foregoing I have hereunto set my hand this 11th day of August, 1875.

WILL C. CHAMPION.

Witnesses:
C. L. EVERT,
C. SPENCER.